April 17, 1956

G. LACHMANN 2,741,964

TWIN-LENS REFLEX CAMERA

Filed April 20, 1955

April 17, 1956 G. LACHMANN 2,741,964
TWIN-LENS REFLEX CAMERA
Filed April 20, 1955 5 Sheets-Sheet 2

United States Patent Office 2,741,964
Patented Apr. 17, 1956

2,741,964

TWIN-LENS REFLEX CAMERA

Gunter Lachmann, Munich, Germany, assignor to Voigtlander Aktiengesellschaft, Braunschweig, Germany, a corporation of Germany Application April 20, 1955, Serial No. 502,567

Claims priority, application Germany April 29, 1954

25 Claims. (Cl. 95—44)

This invention relates to reflex cameras in which the image is reflected by means of a mirror to a focusing screen and it has particular relation to reflex cameras known under the name "twin-lens reflex cameras," provided with exchangeable objectives.

In cameras provided with exchangeable objectives, it has already been known to arrange behind the picture-taking objective of the camera a shutter-curtain or the like, which is automatically moved to closed position when the objective is removed. Thus, penetration of light into the camera during the exchange of the objective is prevented.

According to the present invention, in a twin-lens reflex camera provided with a removable common objective board for the picture taking objective and the finder lens, the member for protecting from light, which can be swung into the path of picture taking rays, is coupled with the finder shaft flap provided in the upper part of the camera in such a manner that these two protecting members can be brought only jointly into closed position or open position. In comparison with the known arrangements, this construction has the advantage that the flap for protecting from light is active not only when the objective is removed, but generally when the finder shaft is closed and when the camera is not used. This is an advantage particularly also in view of the fact that according to experience some of the known central shutters permit the penetration of some light if they are used for a long period of time.

The protective flaps coupled with each other are additionally mechanically connected with the means for bolting the objective board, or with the objective board, in such a manner that the bolting or the objective board, respectively, can be released in closed position of the flaps only. The safety resulting herefrom with regard to inadvertent exposure during the exchange of objectives is supplemented by a bolting device arranged between the objective board, on the one hand, and the finder shaft flap and the flap for protecting from light, on the other hand, said bolting device being designed in such a manner that it prevents opening of the finder shaft flap when the objective board is removed.

Instead of the flaps any other equivalent means can be used.

In the appended drawings the invention is illustrated, by way of example, by two embodiments, to which the invention is not limited. In the drawings:

Fig. 1 illustrates a twin-lens reflex camera, in which the finder shaft flap is coupled with a flap for protecting from light and in which additionally the finder shaft flap is mechanically coupled with the bolting means for the objective board; the camera is shown in lateral view, partially in section along line I—I in Fig. 2;

Figure 2:
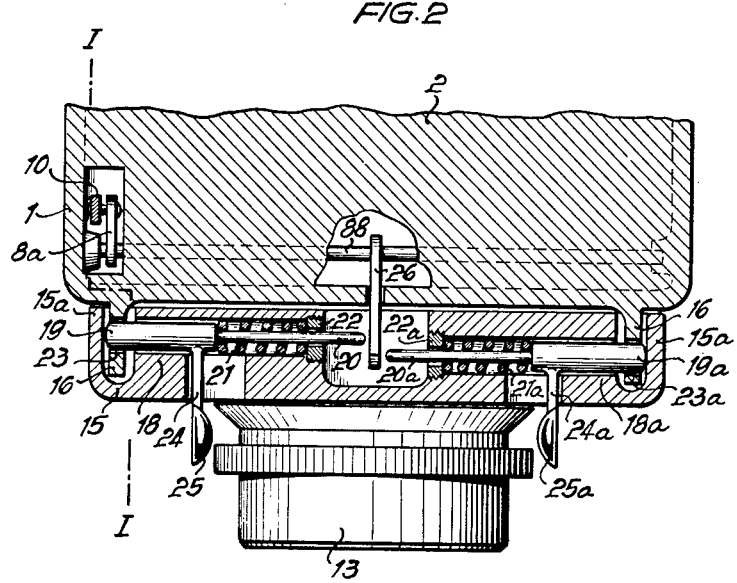
Fig. 2 illustrates the elements of the means for bolting the objective board in top view in section along line II—II in Fig. 1.

Referring now to the drawings in detail, in Fig. 1 reference symbol 1 denotes the casing of a twin-lens reflex camera. The latter is subdivided in conventional manner by a partition 2 into a picture taking shaft 3 and a finder shaft 4. The picture taking shaft 3 comprises the film supplying spool 133, from which the roll film is passed to the wind-up spool 144, which is located in finder shaft 4. Reference numeral 5 denotes a reflex mirror which is fixedly arranged in the finder shaft 4 and held in a frame. The upper wall of the finder shaft is formed in conventional manner by a ground-glass plate 6 or the like, which can be covered in a light-proof manner by finder shaft flap 7 which is swingably arranged on shaft 77. A flap 8 for protecting from light, which can be likewise swung in a light-proof manner in front of a picture taking opening 9, is fastened to a rotatably arranged shaft 88 in picture taking shaft 3. Both flaps 7 and 8 are coupled with each other over connecting members 7a, 8a, by a coupling rod 10 in such a manner that both of them are at the same time either in the closed position or in the open position. A tension spring 11 engaging coupling rod 10 permanently tends to draw the flaps to their open position. On the other hand, bolting elements 12, 12a, or the like, are arranged on the finder shaft flap 7 and casing 1, by means of which the finder shaft 7 can be bolted in its closed position. An objective board 15 which carries the picture taking objective 13 provided with shutter 13a, as well as finder lens 14, is arranged on the front wall of the camera. This objective board 15a is provided with a bolting device shown in more detail in Fig. 2, said device being, in turn, mechanically connected with flaps 7, 8. As a stop for the flap 8 for protecting from light, a frame 333 which is arranged in inclined position relative to the optical axis, is located in picture taking shaft 3 and said frame is designed for protection from light which may penetrate into the shaft. As in view of the inclined position of stop frame 333, the flap 8 for protecting from light does not have the full swinging range which is available to the finder shaft flap 7, from which the swinging movement is transmitted, shaft 88 is provided with a transmission gear or a friction coupling, or flap 8 for protection from light is elastically connected with the transmission gear (8a, 10).

Figure 2 illustrates a preferred embodiment of the bolting device for the objective board 15. A rectangular frame 16 is formed on the front wall of camera casing 1. It is overlapped by sidewalls 15a of the objective board 15. Two bolting blocks 18 and 18a are arranged on the surface turned toward camera body 1, of the objective board 15. Said blocks have bores for guiding bolting members 19 and 19a. These bolting members 19 and 19a have extensions 20 and 20a, on which springs 21 and 21a, respectively, are placed. At the ends of the bores in blocks 18 and 18a, guide rings 22 are screwed in, through which extensions 20 and 20a pass. Springs 21 and 21a are fixedly supported at their inner end, and they exert pressure on the front surfaces of bolting members 19 and 19a, thereby holding the latter in the position shown in Figure 2. Thereby, the free ends of bolting members 19 and 19a enter holes 23 and 23a of frame 16, so that objective board 15 is thereby held on the camera body 1. Bars 24 and 24a provided on bolting members 19 and 19a, extend through the front wall of the objective board 15 and are provided with handle members 25 and 25a. By simultaneous displacement of both members 25 and 25a toward each other, the bolting can be released.

However, in the position shown in Figures 1 and 2 of the operative parts, release of the bolting described above is not possible. The reason is that at open position of the finder shaft flap 7 and the flap 8 for protecting from light, a locking segment 26 fastened to shaft 88, enters the range of movement of extensions 20 and 20a of bolting members 19 and 19a and prevents movement thereof. Only after closing finder shaft flap 7 and thereby closing also protecting flap 8, is locking segment 26 removed from the range of motion of extensions 20 and 20a, by rotation of shaft 88, which takes place when flaps 7 and 8 are closed. Now, by displacing members 25 and 25a, it is possible to remove bolting members 19 and 19a from holes 23 and 23a and thus release bolting between the objective board 15 and camera body 1. The bores for bolting members 19 and 19a, in blocks 18 and 18a, are—as can be seen from Fig. 2—staggered relative to each other, so that extensions 20 and 20a do not contact each other during their unbolting movement.

Figure 3:
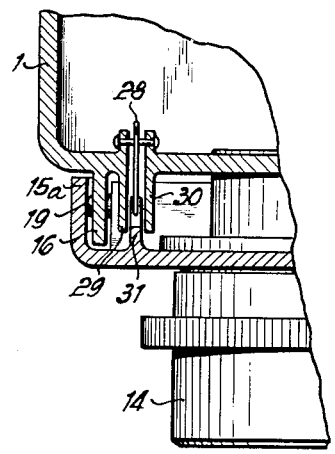
Fig. 3 illustrates the bolting device provided between the objective board and the finder shaft flap, in top view and in section along line III—III in Fig. 1.

The bolting arrangement which prevents opening of the finder shaft flap and protecting flap 8 when the objective board is removed from the camera casing 1, is shown in more detail in Figures 1 and 3. Arm 27 is fastened to shaft 77, which carries out rotation simultaneously with the swinging of finder shaft flap 7. A bolt 28, which is pivotally fastened on the inner surface of the front wall of the camera casing, projects into the range of motion of said arm 27, said bolt 28 being under the effect of a spring 28a, which tends to turn it in clockwise direction. The free arm of bolt 28 penetrates the front wall of camera casing 1 and projects into the space between two flaps 29 and 30 (see Figure 3) provided on the outer side of the camera wall. A cam 31 provided on the surface turned toward the camera body, of the objective board, likewise projects into the space between flaps 29 and 30. Thereby, the cam 31 engages the free arm of bolt 28 and causes the later to swing against the effect of the spring 28a, to such an extent that the nose of bolt 28 is removed from the range of movement of the bolt arm 27. Figures 1 illustrates this position of the operative members in which the finder shaft flap 7 can be closed and opened without hindrance.

Upon removing objective board 15 from camera body 1—a step which can be carried out only at closed position of the finder shaft flap 7—cam 31 is also released from bolt 28. The latter will be then at once caused by spring 28a to swing and will reach with its nose behind arm 27, which is now located in its range of motion. Thereby, opening of finder shaft flap 7 is prevented, when the objective board 15 is removed. This bolting is released again only when upon application of an objective board 15, cam 31 of the later causes bolt 28 to swing to a position, in which arm 27 is released.

Figure 4:
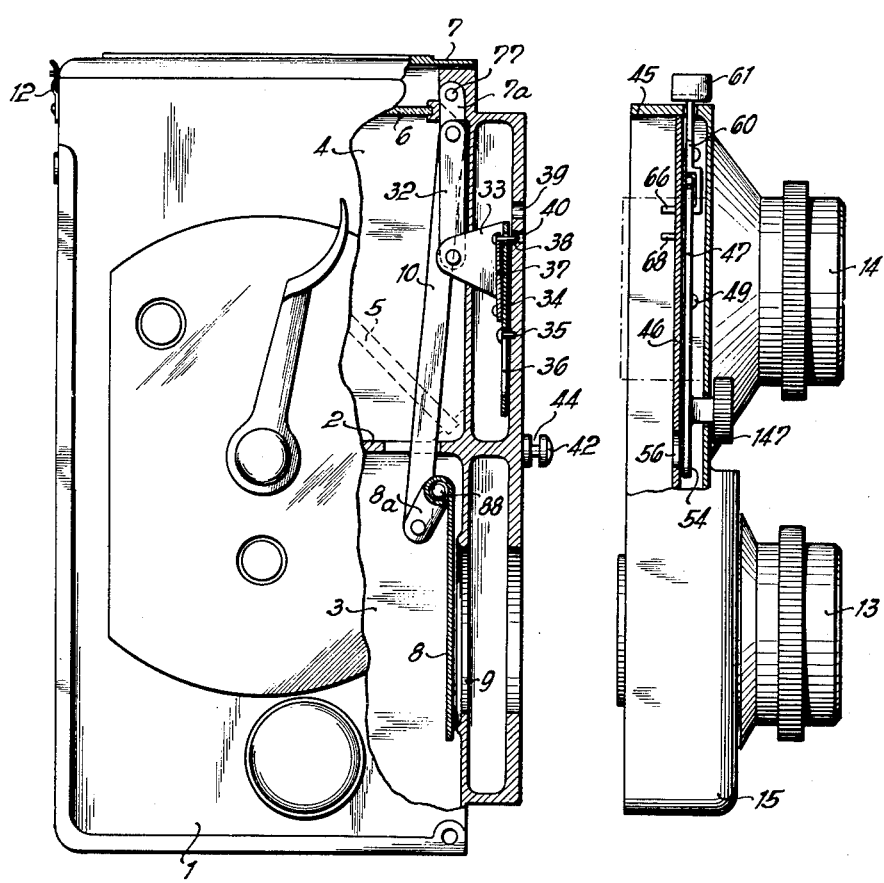
Fig. 4 shows, as a second embodiment of the invention, in lateral view, partially in section, the casing of a twin-lens reflex camera with its objective board removed from the casing; the section is along line IV—IV in Fig. 5.
Figure 5:
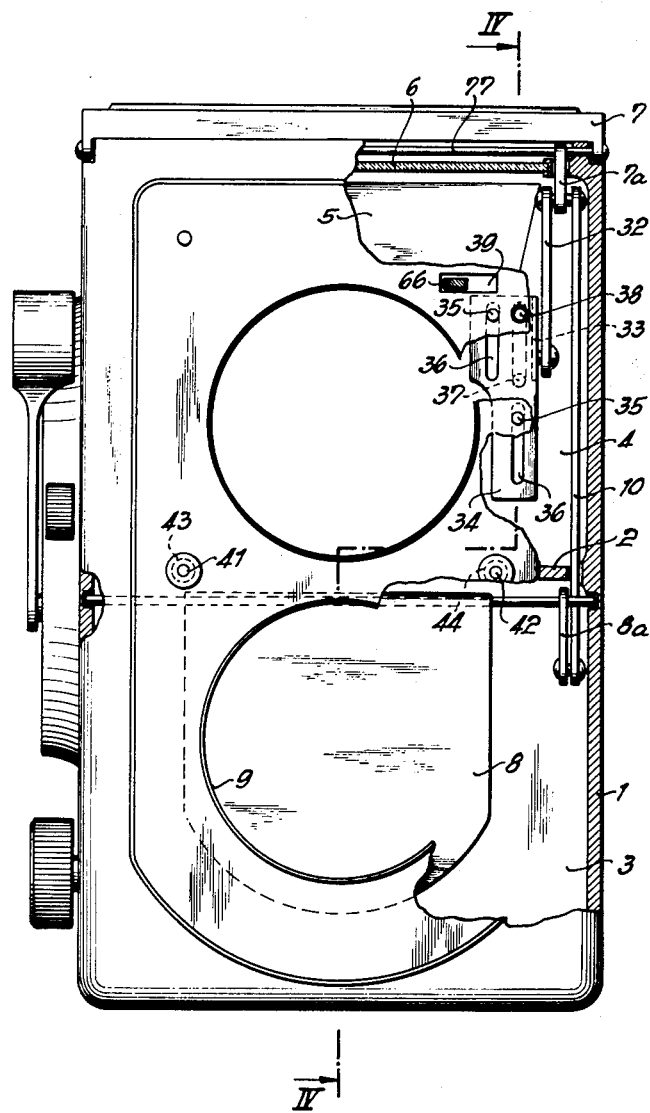
Fig. 5 is the front view of the camera casing shown in Fig. 4, with the front walls partially broken away.
Figure 6:
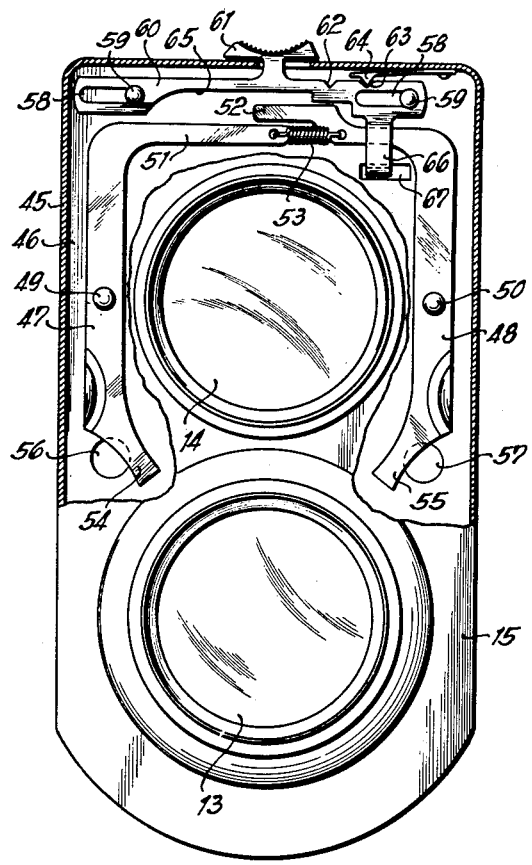
Fig. 6 is a top view of the front part of the objective board shown in Fig. 4, the front wall being partially broken away.

While in the embodiment described above, the operative elements, by which the objective board is bolted with the camera casing, come in direct connection with operative parts of the mechanism connected with the finder shaft flap (extensions 20 and 20a of bolting members 19 and 19a and locking segment 26 cooperate), there is no such connection in the embodiment shown in Figures 4, 5 and 6.

In this embodiment, the objective board proper is provided with a locking device for locking and releasing actuation of the bolting device between the objective board and the camera body, said locking device being, in turn, connected with the mechanism coupled with the finder shaft flap.

In Figure 4, reference symbol 1 denotes again the casing of a twin-lens reflex camera. A partition 2 divides this casing into a picture-taking shaft 3 and a finder shaft 4, which contains the reflex mirror 5 and above which the ground-glass plate 6 is arranged. The latter is covered by a finder shaft flap 7 which is fixedly connected with a shaft 77 rotatably arranged in the camera body, said flap 7 being adapted to swing about said shaft 77. A connecting member 7a is fastened to shaft 77. Pivotally connected with said member 7a is a coupling rod 10, which projects into picture-taking shaft 3 through an opening in partition 2. In the latter, coupling rod 10 is connected with a member 8a fastened to a shaft 88. Flap 8 for protecting from lights is also connected to shaft 88 in such a manner that it forms a light-proof seal for a picture-taking opening 9 in the front wall of camera casing 1, when the finder shaft flap 7 covers the focusing plate 6 and is held in this closed position by a snap bolt 12. Upon shifting flap 7 to open position, protecting flap 8 is likewise caused over member 7a, coupling rod 10 and member 8a, to swing to a position, in which said opening 9 is freed.

In addition to coupling rod 10, steering member 7a is also pivotally connected with a connecting rod 32, the other end of which is connected with an angle flap 33 of a slide 34. This slide is guided by means of pins 35 and slots 36 on the inner surface of the front wall of the camera and it moves in its guide when flap 7 is opened and closed, respectively. A leaf spring 37 is fastened to slide 34, and the free, elastic end of said spring carries a pin 38. Said pin 38 extends through a hole of slide 34 and projects into a bore 40 in the camera front wall 1. In said wall a slot-shaped opening 39 is provided, which is in part in the range of movement of slide 34, as particularly shown in Figure 5. Also fastened to the front wall of casing 1 are two bolting members 41, 42, on which circular bolting grooves are provided.

The removable objective board 15 carries a picture-taking objective 13 provided with shutter and a finder objective 14 and has a peripheral backward extending wall 45. The bolting device and the locking means therefor, are arranged on a partition 46.

As shown particularly in Fig. 6, the bolting device consists of bolting segments 47 and 48, which are swingably arranged about screws 49 and 50, or the like, fastened to partition 46. Bolting segment 47 has an angle arm 51 which extends into the range of movement of an angle arm 52, which is provided on bolting member 48 and has a second bend, as shown by Fig. 6. The ends of a tension spring 53 are fastened to arms 51 and 52, said spring urging the arms to lie against each other. The slightly bent free other ends of segments 47 and 48 are designed as bolting noses 54, 55. In the range of movement of the latter, recesses 56 and 57 are provided in the partition 46. Bolting members 41 and 42 pass through said recesses when the objective board is applied to the camera casing 1. Bolting noses 54 and 55 engage bolting grooves 43, 44 of members 41 and 42, respectively, and thus bolt together objective board 15 and camera casing 1. Outwardly projecting handling elements 147, 148 are provided on bolting segments 47 and 48, respectively and the latter can be moved by means of said elements 147, 148.

Furthermore, a locking slide 60, which is movably guided by slots 58 and pins 59, is also arranged on partition 46. A bar provided on this slide passes through wall 45 and is provided with an adjusting knob 61 on the outside. In slide 60 two detent notches 62, 63 are provided, which can be engaged by an elastic catch 64 fastened on the wall 45. A recess 65 is provided in the middle of slide 60. The latter is also provided with a locking flap 66, which overlaps arm 52 of bolting segment 48 and, bent in backward direction, passes through a slot 67 in partition 46. As shown by Fig. 4, a pin 68 is fastened on the surface of partition 46, which is turned toward camera body 1, in such a manner that it engages pin 38 and forces out the pin from bore 40 when the objective board 15 is applied to camera body 1.

The above described parts co-operate with each other in the following manner:

In Fig. 4 the camera is shown with closed finder shaft flap 7 and likewise closed protective flap 8, the objective board 15 being removed. By member 7a and connecting rod 32, the slide 34 is thereby brought to a position, in which detent pin 38 is forced into bore 40 by leaf spring 37. Slide 34 is thus bolted in this position. At the same time, opening of finder shaft flap 7 and of protecting flap 8 is also prevented, because connecting rod 32, which is connected with locking slide 32 locks over member 7a rotation of shaft 77.

In the position of the operative parts of the bolting device and its locking means shown in Fig. 6, swinging of segments 47 and 48 about their pivot screws 49 and 50 is prevented by the position of locking slide 60. In this position, slide 60 projects into the path of swinging of arm 52 bent from segment 48 and said arm 52 is, in turn, in the path of swinging of arm 51 bent from segment 47. If, by means of adjusting knob 61, the locking slide 60 is displaced to a position, in which catch 64 engages detent notch 62, then recess 65 of locking slide 60 will be in the range of swinging of arms 52 and 51. Now bolting segments 47 and 48 can be caused to swing by moving handle members 147 and 148 toward each other. Thereby arms 52 and 51 enter the range of the recess 65 of locking slide 60. At the same time the bolting noses 54 and 55 free recesses 56 and 57. Bolting members 41 and 42 can pass through said recesses when objective board 15 is applied to the camera 1 now. After release of handle member 147 and 148, tension spring 53, which connects segments 47 and 48, can draw bolting noses 54 and 55 into bolting grooves 43 and 44 of bolts 41 and 42 and hold them there. Thus, objective board 15 and camera casing 1 are bolted with each other.

When the objective board 15 is being attached to the camera casing 1, pin 68, which is fastened to partition 46, forces detent pin 38 out of bore 40 (see Figure 4). Thereby slide 34 is unbolted. However, its movement and also opening of finder shaft flap 7, are still prevented by the end of locking flap 66 provided on the locking slide 60. Upon application of the objective board 15 to the camera casing 1, said end enters that portion of slot-shaped opening 39, which is in the range of movement of slide 34. Only when the locking slide 60 is brought into the bolting position (shown in Fig. 6) for segments 47 and 48, will the end of locking flap 66 move to the position indicated in Figure 5, in which moving of slide 34 and thus opening of finder shaft flap 7 and of protecting flap 8 is now possible.

When both flaps 7 and 8 are open, the slide 34 will be in a position, in which it covers a portion of the slot-shaped opening 39. Thus, it prevents movement of the locking flap 66 and, therefore, it bolts the locking slide 60.

Thus, the above described devices have the following effects:

1. The objective board can be removed from the camera casing 1 only when the finder shaft flap 7 and protecting flap 8 are closed.

2. When the objective board 15 is removed from camera casing 1, finder shaft flap 7 and protecting flap 8 are bolted in their closed position.

3. Opening of flap 7 and flap 8 in the example illustrated in Figures 1, 2 and 3, is possible only when the objective board 15 is bolted with camera casing 1.

4. In the example illustrated in Figures 4, 5, 6, opening of flap 7 and flap 8 is possible only when the objective board 15 is bolted with the camera casing 1 and release of this bolting is prevented by a corresponding position of locking slide 60.

What is claimed is:

1. Photographic twin-lens reflex camera subdivided by a partition into a picture-taking shaft and a finder shaft, comprising an exchangeable objective board for the picture taking objective and the finder lens and also comprising a flap for protection from light, which can be caused to swing into the path of picture-taking rays and a finder shaft flap located on the upper side of the camera, means for coupling said protective flap and said finder shaft flap, in order to permit only simultaneous setting of said flaps to closed position and open position, respectively.

2. Photographic camera, as claimed in claim 1, comprising means for bolting the objective board and connecting means for mechanically connecting the coupled protective flap and finder shaft flap, with said bolting of the objective board in such manner that bolting of the objective board can be released in closed position of the flaps only.

3. Photographic camera, as claimed in claim 1, comprising means for mechanically connecting the coupled protective flap and finder shaft flap with the objective board in such manner that the objective board can be exchanged only in closed position of the coupled flaps.

4. Photographic camera, as claimed in claim 3, comprising a device for bolting the objective board with the coupled protective flap and finder shaft flap, in order to prevent opening of the finder shaft flap in removed condition of the objective board.

5. Photographic camera, as claimed in claim 1, in which the finder shaft flap, as well as the protective flap is provided with a steering element, said steering elements being connected by a coupling rod.

6. Photographic camera, as claimed in claim 5, comprising a spring arranged between the coupling rod and the camera casing, said spring urging the finder shaft flap to open position.

7. Photographic camera, as claimed in claim 2, in which the means for bolting the objective board has two opposite handle members which can be actuated like pincers by forcing them toward each other; the objective board being provided with two block-shaped elements, and a bolting member being provided in each of said blocks, for guiding said handle members for displacement toward each other, said bolting members being slightly staggered relative to each other and said handle members being permanently elastically urged away from each other, and the outer ends of the bolting members engaging the camera body.

8. Photographic camera, as claimed in claim 7, in which the flap for protecting from light carries a segment which, in open position of the flap for protecting from light, comes to stand between the oppositely located ends of the bolting members and thus prevents actuation of the handle members and release of the objective board in this position, while in closed position of the protective flap said segment comes to stand in a position, in which it does not prevent actuation of the handle members.

9. Photographic camera, as claimed in claim 4, in which a swingable bolt is pivotally fastened to the camera body, said bolt being caused by spring effect, in closed position of the finder flap, to lockingly swing behind an arm connected with the finder shaft flap and projecting therefrom in about a right angle; the objective board being provided with a cam having an inclined surface; said cam being adapted to cause said arm to swing to such an extent that it unbolts the finder shaft flap, upon application of the objective board to the camera.

10. Photographic camera, as claimed in claim 5, in which a frame is arranged in inclined position relative to the optical axis, as a stop for the flap for protecting from light, in the picture taking shaft and means for compensating for the difference between the swinging range of the protective flap and of the finder shaft flap, caused by said stop member, are provided in the coupling between these flaps.

11. Photographic camera, as claimed in claim 2, in which the objective board is provided with a locking device for locking and releasing the means for bolting the objective board with the camera casing, said locking device being connected with a mechanism coupled with the finder shaft flap.

12. Photographic camera, as claimed in claim 11, in which said connection between the locking device and the mechanism coupled with the finder shaft flap is designed in such a manner that the finder shaft flap can be opened only where said locking device is set to a position, in which it locks the bolting means.

13. Photographic camera, as claimed in claim 11, in which the connection between the locking device and the mechanism coupled with the finder shaft flap is designed in such a manner that the locking device can be brought to a position, in which the bolting means is released, only when the finder shaft flap is closed.

14. Photographic camera, as claimed in claim 13, in which the bolting means consists of two segments swingably arranged on the objective board, each of said segments being provided with a bolting nose for engaging the groove of one of two locking bolts provided on the camera casing.

15. Photographic camera, as claimed in claim 14, in which each of the segments is provided with an angle arm, the swinging ranges of which overlap each other.

16. Photographic camera, as claimed in claim 15, including spring means for urging the angle arms to lie against each other.

17. Photographic camera, as claimed in claim 16, in which, in the range of movement of the arms of the segments, a first locking slide is displaceably guided in such a manner that, in one of its end positions, the slide prevents movement of the angle arms, while in its other end position, a recess in the slide is adapted to be engaged by the angle arms.

18. Photographic camera, as claimed in claim 17, in which the locking slide is provided with two notches which define its end positions and a detent is adapted to engage said notches.

19. Photographic camera, as claimed in claim 18, in which the locking slide is provided with a locking flap which projects into a slot-shaped opening of the camera casing wall when the objective board is applied to the camera casing.

20. Photographic camera, as claimed in claim 19, in which in the range of the slot-shaped opening in the wall of the camera casing a second slide is movably guided in such a manner and is mechanically connected with the finder shaft flap in such a manner that, at open position of the finder shaft flap, the slide covers a portion of the slot-shaped opening, while it releases the slot-shaped opening at closed position of the finder shaft flap.

21. Photographic camera as claimed in claim 20, in which said second slide has a leaf spring fastened thereto, the elastic end of which carries a detent pin, which, in the position of this slide at closed position of the finder shaft flap, engages a bore provided in the wall of the camera casing, in order to lock said slide in this position.

22. Photographic camera as claimed in claim 21, in which on the side of the objective board turned toward the camera casing, a pin is provided in such a manner that it forces the detent pin which is elastically fastened to said second slide, out of the bore provided in the wall of the camera casing, when the objective board is applied to the camera casing, in order to unlock said second slide.

23. Photographic camera as claimed in claim 22, in which the locking flap of the locking slide, which projects into a slot-shaped opening of the wall of the camera casing, extends into the range of motion of the second slide and prevents movement of the latter in a position in which the locking slide permits swinging of the bolting segments, when the objective board is applied to the camera.

24. Photographic camera as claimed in claim 22, in which the locking flap of the locking slide, which projects into a slot-shaped opening of the wall of the camera casing, is located outside of the range of movement of the second slide, in a position in which the locking slide locks the swinging of the bolting segments, when the objective board is applied to the camera casing.

25. Photographic camera as claimed in claim 22, in which, at open position of the finder shaft flap, the second slide is located in the range of movement of the locking flap which is provided on the locking slide and projects into a slot-shaped opening of the wall of the camera casing, in such a manner that movement of the locking slide is locked, when the objective board is applied to the camera casing.

No reference cited.